United States Patent

[11] 3,622,986

[72] Inventors Donald T. Tang
Yorktown Heights, N.Y.;
Hiashi Kobayashi, West Los Angeles, Calif.
[21] Appl. No. 889,052
[22] Filed Dec. 30, 1969
[45] Patented Nov. 23, 1971
[73] Assignee International Business Machines Corporation
Armonk, N.Y.

[54] ERROR-DETECTING TECHNIQUE FOR MULTILEVEL PRECODED TRANSMISSION
5 Claims, 5 Drawing Figs.

[52] U.S. Cl. 340/146.1, 340/347, 325/41
[51] Int. Cl. G06f 11/08
[50] Field of Search 340/146.1, 347 DD; 325/38 A, 41, 42

[56] References Cited

UNITED STATES PATENTS

| | | | |
|---|---|---|---|
| 3,337,864 | 8/1967 | Lender | 325/38 A X |
| 3,388,330 | 6/1968 | Kretzmer | 325/42 |
| 3,439,330 | 4/1969 | Sipress et al. | 340/347 X |
| 3,492,578 | 1/1970 | Gerrish et al. | 325/42 |
| 3,510,585 | 5/1970 | Stone | 325/42 X |

*Primary Examiner*—Malcolm A. Morrison
*Assistant Examiner*—James F. Gottman
*Attorneys*—Hanifin and Jancin and Charles P. Boberg

ABSTRACT: Errors introduced during the transmission of digital sequences that have undergone correlative level coding with initial precoding are detected by a scheme that takes advantage of the inherent redundancy in correlative level coding. The received message is decoded in a succession of steps, the first of which is an inverse filtering operation that performs the exact inverse of the correlative encoding operation. If the channel was error-free during this transmission, the sequence constructed by the inverse filtering process is identical with the precoded sequence that was subjected to correlative level coding prior to transmission. If the channel was not error-free, then the sequence constructed by inverse filtering differs from the initial precoded sequence. Whereas the precoded sequence is constrained to a certain permitted number of voltage levels, say *m* levels, the sequence constructed by inverse filtering is not so constrained and may assume more than *m* levels. If more than *m* levels are occupied by the inversely filtered signal, this condition is detected as an indication of transmission error. The final decoding step is performed after this error test is accomplished.

INVENTORS
HISASHI KOBAYASHI
DONALD T. TANG

BY Charles P. Boberg
ATTORNEY

PATENTED NOV 23 1971 3,622,986

ERROR-DETECTING TECHNIQUE FOR MULTILEVEL PRECODED TRANSMISSION

BACKGROUND OF THE INVENTION

The maximum rate at which digital data can be intelligibly transmitted through a limited band-pass channel depends upon the effects of intersymbol interference within the channel. As pulsed signals representing digits or other symbols are transmitted through the channel, each pulse generates certain time-distributed signal components which, unless rendered ineffective, may interfere with the transmission of one or more succeeding pulses, if the pulses are spaced more closely than a critical amount.

One well-known technique for reducing the permissible time-spacing between successive digit signals is "correlative level coding" (also known by other names, such as "partial-response signaling" or "digital modulation"), wherein each signal is combined with some function of a signal transmitted earlier in that sequence. This may be accomplished, for example, by a modulating operation in which each digit signal in the transmitted sequence is added algebraically to the time-delayed inverse of a digit signal transmitted two pulse periods earlier. By using this encoding method and tolerating a controlled amount of interference, one can obtain a substantial increase in the transmission rate.

Although correlative level coding increases the transmission rate, it has some attendant disadvantages. First, it causes an increase in the number of signal levels from $m$ levels at the source to a larger number of levels, M, at the receiving end of the channel. Thus, the type of encoding described above causes the number of possible signal levels to increase from $m$ to $2m-1$. If, for example, the original sequence has only two signal levels, +1 and 0, then the modulating operation may produce signals at any of three levels, +1, 0 and −1, respectively. Similarly, an original three-level sequence may have as many as five signal levels after encoding. The increase in the number of available signal levels due to correlative encoding is not regarded as a serious disadvantage when compared with the advantage of an increased digital transmission rate, however, and this aspect of correlative level coding is mentioned here only because it has an important bearing upon the present inventive concept.

A second disadvantage of correlative level encoding is that it may cause the propagation of transmission errors. Thus, if a particular digit is incorrectly transmitted, this single error may be propagated as a chain of errors in the decoded sequence at the receiving end of the system. This in itself is not regarded as a serious problem, because the propagation of errors can be eliminated by known precoding techniques. However, precoding will not eliminate individual, unpropagated transmission errors. Furthermore, the use of these precoding techniques has encouraged the use of decoding methods which do not have the capability of detecting transmission errors.

SUMMARY OF THE INVENTION

An object of the present invention is to improve the operation of correlative level coding systems so that transmission errors can be detected in a simple, expeditious manner which does not require extensive alteration of the conventional system design.

To accomplish this objective, the invention utilizes a special property of the correlative level coding process which has not heretofore been recognized or proposed for that purpose. If all possible $m$ level sequences are correlatively encoded into higher M-level sequences, this process will not exhaust the total number of M-level sequences that theoretically could be formed, no matter how many $m$ level sequences are encoded. Stating this another way, there will always be some M-level sequences that could not possibly have originated as $m$ level sequences in the particular encoding scheme employed. M-level sequences in this particular category can originate only as sequences having greater than $m$ levels. Hence, if a received transmission contains M-level sequences of this kind, one of two things is indicated: Either the original sequence contained signals in more than the permissible $m$ levels, or there was some error in transmission which now makes it appear as though the original sequence had more than these $m$ levels. Since the former can be ruled out in any given system (barring a rare malfunction of the encoder itself), the latter proposition then can be accepted as true.

The conventional way of decoding a correlatively encoded sequence fails to recognize and take advantage of the property just stated. The present invention, on the other hand, utilizes this principle by a method of progressively decoding the received sequence. First, it derives or constructs the input sequence that would have been required hypothetically to generate the sequence that actually was received, assuming that the transmission channel had been operating properly. If this derived sequence has more than the permissible number of input signal levels, this then is a positive indication that the channel did not operate properly during the transmission of that sequence, thereby introducing an error into the message. While this method may not detect all transmission errors that possibly will occur, it will detect all such errors that conceivably are capable of being detected by exploiting the inherent redundancy of the M-level output sequences.

The apparatus needed for converting the received sequence into a hypothetical precoded sequence and detecting the number of input levels therein is of relatively simple design and will not add substantially to the cost of the system, in comparison with the benefits gained. This error detecting method will not actually determine the position of the error in the sequence or correct it when found, but there are other available methods of doing this, once the presence of an error has been detected. In many cases, it is enough merely to know that an error is present somewhere in the sequence, so that a block of messages can be retransmitted, for example.

Thus, the invention utilizes the inherent redundancy of the correlative level coding process for enabling transmission errors to be detected in a novel manner that does not involve expensive or complicated changes in the basic system. The principal improvement is the use of a two-stage decoding method in which the decoding logic of the first stage does not constrain the number of levels that may be occupied by the decoded signal. Levels in excess of the permitted number will be manifested if the decoding logic requires this, and merely by detecting the existence of these superfluous levels, the decoding apparatus thereby detects the presence of transmission errors. Final decoding of the received signal does not take place until this error test has been performed.

DETAILED DESCRIPTION OF INVENTION

Figure 1:
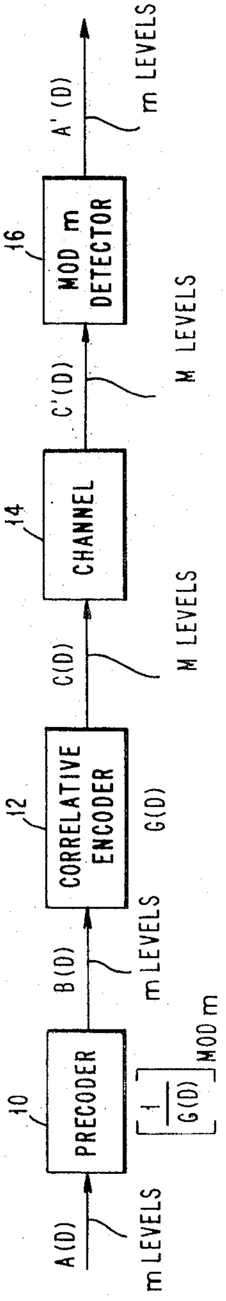
FIG. 1 PRIOR ART
FIG. 1 is a block diagram showing a conventional type of correlative level coding system.
Figure 2:
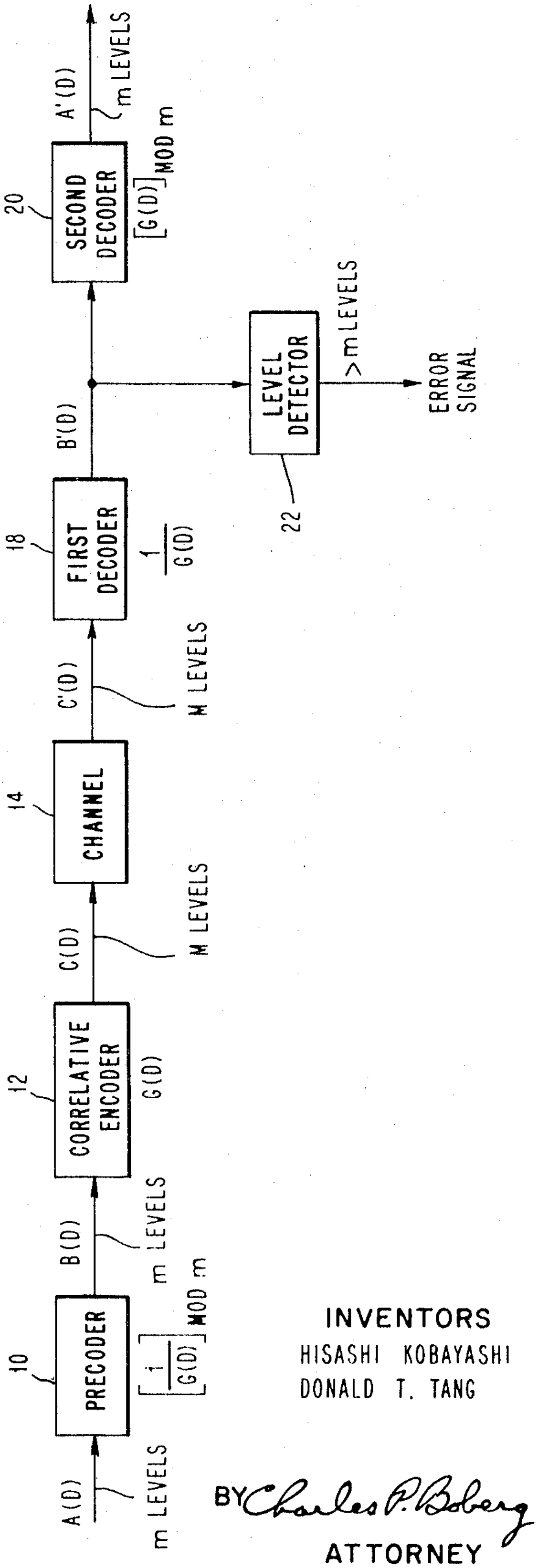
FIG. 2 is a block diagram showing an improved correlative level coding system which embodies the principle of the invention.
Figure 3:
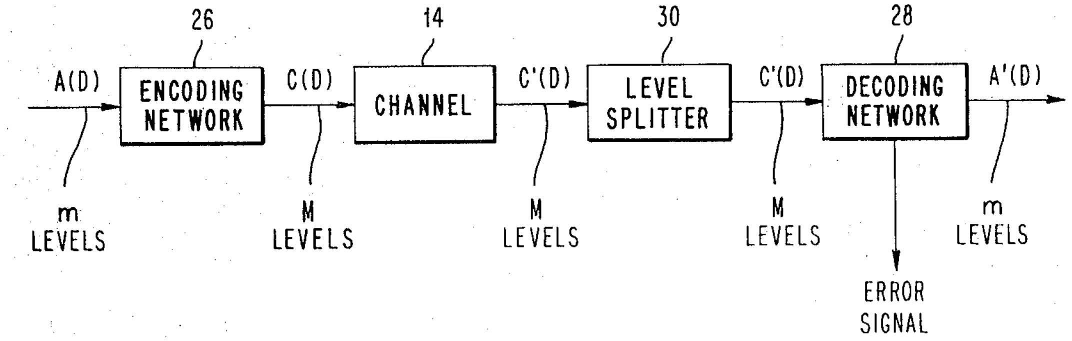
FIG. 3 represents a modification of the improved system shown in FIG. 2.
Figure 4:
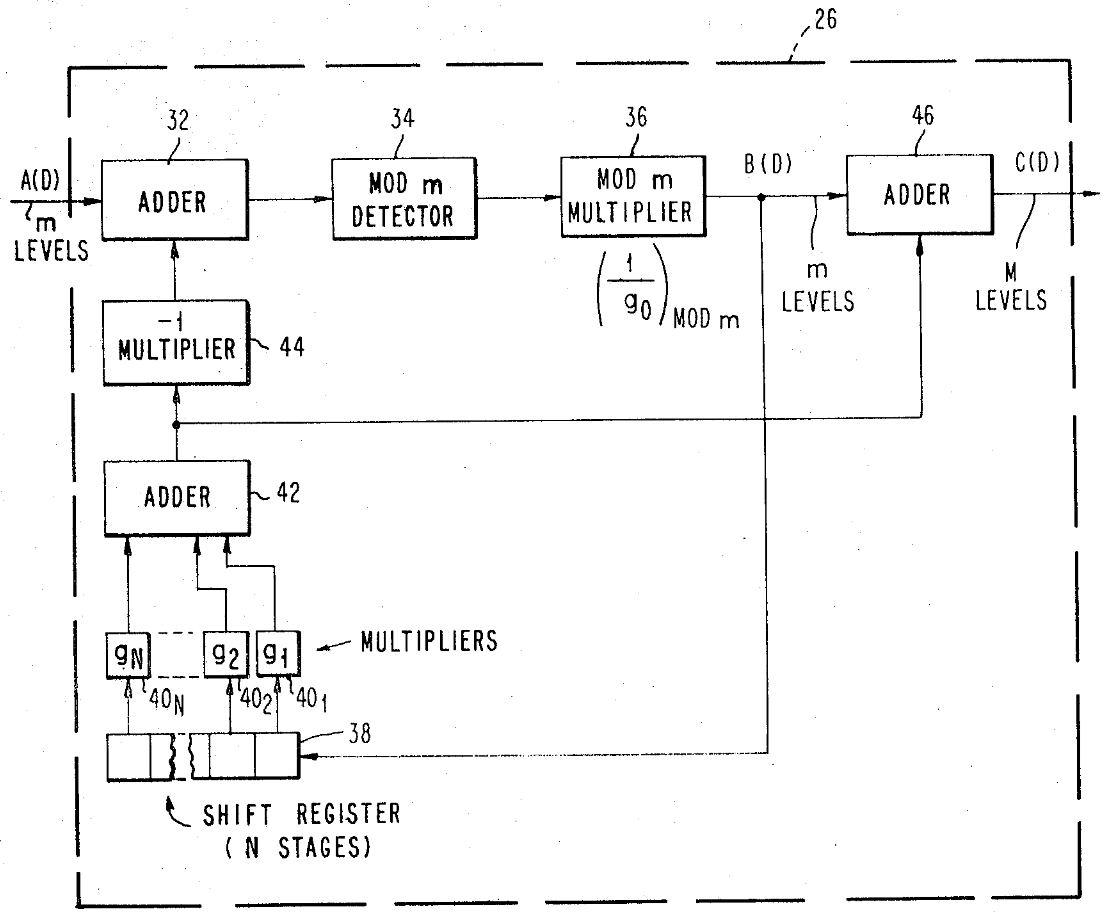
FIGS. 4 and 5 show in greater detail the construction of certain portions of the modified system shown in FIG. 3.
Figure 5:
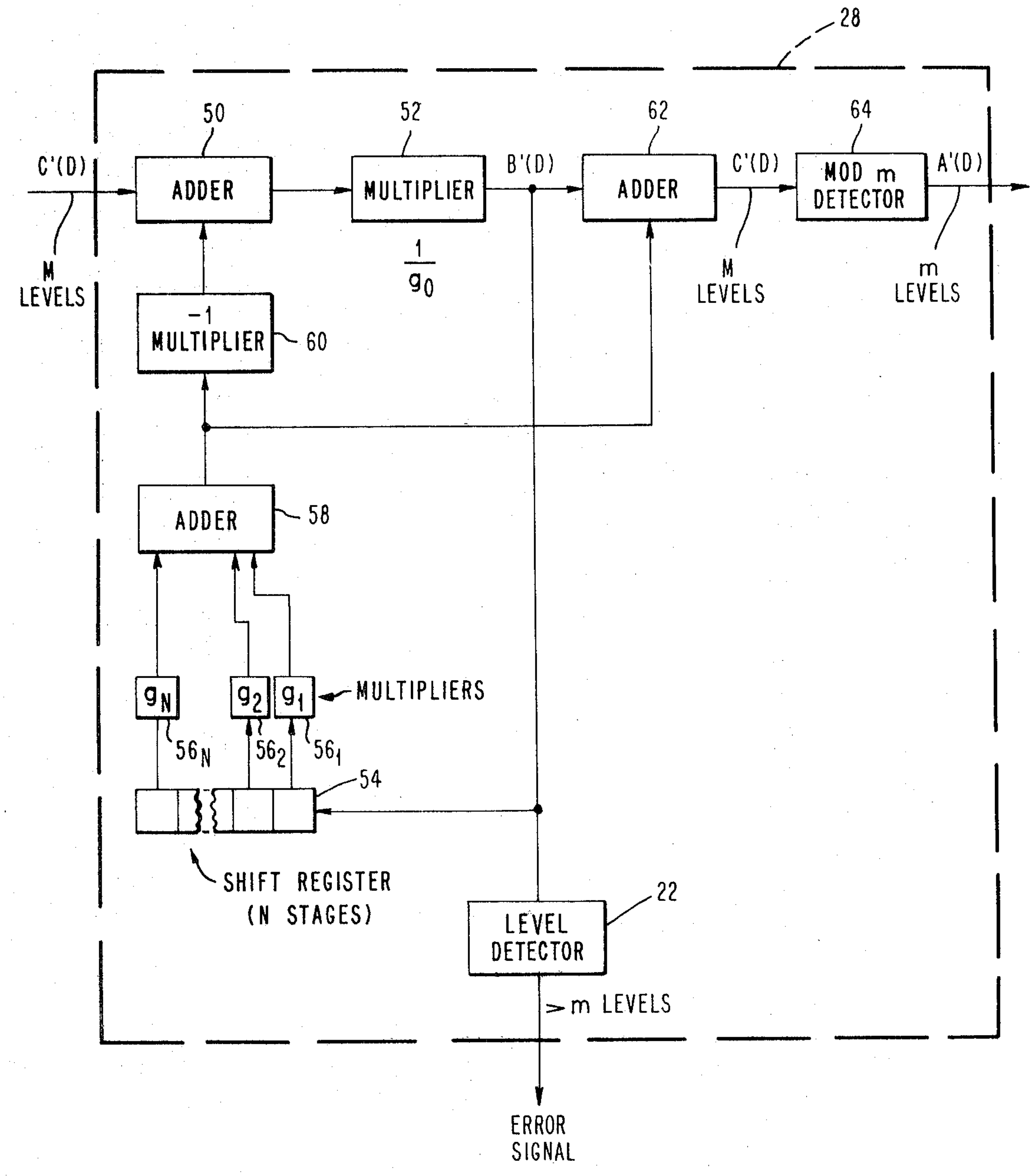

A preferred embodiment of the invention is illustrated in FIG. 2, and a modification thereof is shown in FIGS. 3–5. Before describing these embodiments in detail, however, attention will be given briefly to FIG. 1, which represents the type of correlative level coding system commonly used prior to the present invention. A comparison of FIG. 2 with FIG. 1, particularly at the receiving or decoding end of the system, will readily indicate the principal improvement effected by the invention.

Throughout this description, various digit sequences will be referred to by nomenclature such as A(D), for example, which represents a polynomial of the form $$\sum_{i=0}^{\infty} a_i D^i$$

where D is a time delay operator. In other words, any given sequence of digits may be regarded as a power series having the form $A(D)=a_0+a_1D+a_2D^2+a_3D^3+\ldots\ldots$, wherein the exponent of each power term represents its relative time position in the sequence. This will be explained more fully hereinafter. Similarly, reference also will be made herein to a transfer function G(D) characterizing the correlative level coding scheme, which function can be expressed as a polynomial of the form $$\sum_{i=0}^{N} g_i D^i$$

where N is a finite number.

In the conventional type of correlative level coding system depicted by FIG. 1, an $m$ level input sequence A(D) is fed to a precoder 10, which converts it to a different $m$ level sequence b(D), the relationship between these two sequences being explained presently. The purpose of precoding, as explained above, is to prevent the propagation of a chain of errors from a single error in the received transmission, this precoding step being necessary in any correlative level coding system.

A correlative encoder 12 converts the $m$ level sequence B(D) into a higher-level sequence C(D) preparatory to its transmission through the limited band-pass channel 14. Mathematically, as will be explained hereinafter, correlative level coding has the effect of causing the $m$ level sequence B(D) fed into the encoder 12 to be multiplied by a transfer function G(D), thereby to produce a resulting sequence C(D) that contains M-levels.

After being transmitted through channel 14, the communicated digital information emerges as a M-level sequence C'(D), which may or may not be identical with the transmitted sequence C(D), depending upon whether or not the channel 14 operated properly at all times during the transmission of the sequence. With precoded information, it is possible to decode the received sequence C'(D) by a very simple process that involves the use of a "mod $m$" detector 16, which converts the M-level sequence C'(D) directly into an $m$ level sequence A'(D), presumably identical with the original input sequence A(D). Unfortunately, the conventional system shown in FIG. 1 does not automatically detect any discrepancy between the output sequence A'(D) and the input sequence A(D) that might have been introduced by channel noise during the transmission of the sequence. One purpose of the present invention is to provide an automatic indication of such error whenever it occurs.

The invention does not necessarily require any change in the transmitting end of the system to accomplish the objective just stated. Thus, as shown in FIG. 2, the precoder 10, correlative encoder 12 and channel 14 may, if desired, be identical with the correspondingly numbered parts of the conventional system shown in FIG. 1. At the receiving end of the system, however, the conventional "mod $m$" detector 16 is replaced by a first decoder 18 and a second decoder 20 arranged in series. The decoder 18 is an inverse filter that converts the M-level sequence C'(D) to an intermediate sequence B'(D) that presumably is identical with the $m$ level precoded sequence B(D), but which can assume more than $m$ levels. If the intermediate sequence B'(D) contains any level other than the permissible input levels, this fact is detected by a level detector 22, which then furnishes an appropriate error signal. The intermediate sequence B'(D) is converted by decoder 20 to an output sequence A'(D), which is considered to be identical with the original input sequence A(D) only if no error signal has been furnished by the level detector 22. Alternatively, the system could be arranged so that an error signal suppresses the received message and calls for a retransmission of this message.

Employing the notation previously described herein, one may represent each of the digit sequences handled by the system of FIG. 1 or FIG. 2 as a polynomial in powers of D, the time-delay operator. For example, assume that the input sequence A(D) is a binary sequence (i.e., two-level sequence) composed of digits 1100101 which are to be transmitted in the order named. This sequence may be viewed alternatively as a power series or polynomial $a_0+a_1D+a_2D^2+a_3D^3+a_4D^4+\ldots\ldots$, in which the various power terms have the following coefficients:

$a_0=1$
$a_1=1$
$a_2=0$
$a_3=0$
$a_4=1$
$a_5=0$
$a_6=1$

Eliminating the coefficients that have zero values, the aforesaid sequence A(D) reduces to: $1+D+D^4+D^6$, in which the exponent of each power term indicates its time position in the sequence.

In one well-known form of correlative level coding that is utilized to reduce intersymbol interference in channels of a commonly used type, the transfer function G(D) is $1-D^2$. The precoder 10, FIG. 1 or FIG. 2, multiplies the input sequence A(D) by the inverse of the transfer function, i.e., by 1/G(D), which is to say that it divides A(D) by G(D), and it expresses the result in "mod $m$" form, discarding all but the $m$ level residue of each coefficient in the resulting series. Thus, for example, the result of dividing the sequence $1+D+D^4+D^6$ by $1-D^2$, when expressed as a true quotient, would be $1+D+D^2+D^3+2D^4+D^5+D^6+\ldots\ldots$ However, if $m=2$, this quotient series, when expressed in "mod $m$" form, would be lacking a $D^4$ term, since the coefficient "2" reduces to zero in "mod 2" notation. Hence, for the case where $m=2$, an input sequence $A(D)=1100101$ produces a precoded sequence $B(D)=1111011$ at the output of the precoder 10.

The operation of the precoder 10 for an assumed transfer function $G(D)=1-D^2$ can be expressed equivalently by the following relationship:

$$b_k=a_k+b_{k-2},\ \text{mod}\ m;$$

where $b_k$ and $a_k$, respectively, are the $k$—th terms of the sequences A(D) and B(D), FIG. 1 or FIG. 2.

Considering now the operation of the correlative encoder 12, this unit multiplies the precoded sequence B(D) by the transfer function G(D) and expresses the result as a true product, utilizing as many as M discrete value levels for this purpose. Thus, if $G(D)=1-D^2$, as assumed hereinabove, and $B(D)=11\bar{1}1011$, the resulting sequence C(D) at the output of the encoder 12 would be $C(D)=1100-101\ldots$, a sequence occupying the three value levels 1, 0 and −1. Hence, a 2-level sequence can be converted to a 3-level sequence by the encoder 12, depending upon the particular composition of the 2-level sequence.

The operation of the encoder 12 for the assumed transfer function $1-D^2$ can be expressed equivalently by the relationship:

$$c_k=b_k-b_{k-2},$$

where $c_k$ and $b_k$, respectively, are the $k$—th terms of the sequences C(D) and B(D).

In general, a sequence having $m$ levels can be correlatively encoded into a sequence having a greater number of levels, M, or a number of levels less than M. As a corollary to this, there are many M-level sequences that can result from the encoding of sequences having more than $m$ levels.

For the purpose of this description, it will be assumed that the encoder 12 operates perfectly at all times. However, the channel 14 through which the encoded sequence C(D) is transmitted is susceptible to occasional transient errors, so that the sequence C'(D) received from the channel 14 does not necessarily correspond exactly to the sequence C(D) which was transmitted through the channel.

The present invention is based upon the discovery that in a great many instances, the receipt of an erroneous transmission is readily detectable if one knows the number of levels that would be required in a hypothetical input sequence B′(D) in order to produce the correlatively encoded output sequence C′(D) which actually was received from the channel 14, if the channel were error-free. If any level in B′(D) is outside the permissible range of *m* levels, this is a positive indication of transmission error, because no permissible input sequence would have contained such a level. However, the simple "mod *m*" detector 16, FIG. 1, which is employed in the conventional correlative level coding system is constrained to an *m* level output, and even a spurious sequence C′(D) that could not logically have resulted from the encoding of an *m* level sequence will be decoded nevertheless into an *m* level output sequence A′(D) by the mod *m* detection process.

The reason why a mod *m* detector is used in conventional systems is that it is extremely simple and performs a final decoding operation in a single step. That is to say, it inverts the combined effect of the encoders 10 and 12 merely by converting each digit in the sequence C′(D) having a value outside of the permitted *m* level range into its *m* level equivalent. For example, where $m=2$, all that the mod *m* detector 16 need do is to convert each minus value in the three-level sequence C′(D) to a corresponding plus value in the two-level sequence A′(D). Thus, a mod 2 detector would convert each −1 in the sequence C′(D) to a +1 in the sequence A′(D), while +1 and 0 values in the sequence C′(D) would be left unchanged.

A system embodying the invention, as represented in FIG. 2, does not seek to perform the decoding operation in the simplest possible way, as the conventional system of FIG. 1 does. Rather, it accomplishes its decoding function in a two-stage operation which inverts the two-stage encoding operation performed by the precoder 10 and the correlative encoder 12.

Thus, whereas the encoder 12 effectively multiples the precoded intermediate sequence B(D) by the transfer function G(D) to produce the correlatively encoded sequence C(D), the first decoder 18 divides the received sequence C′(D) by G(D) to produce an intermediate sequence B′(D) which is the exact inverse of sequence C′(D). This reconstructed sequence B′(D), should be identical with the precoded sequence B(D), if the transmission channel 14 is error-free. Among other things, this means that the sequence B′(D) should not occupy any voltage or value level outside of the *m* level range that was available to the sequence B(D). If any signal component in the sequence B′(D) should extend into a level that is outside of the permitted range of levels, this indicates that there must have been an error during the transmission of the sequence C(D) through the channel 14 (if one makes the logical assumption that all parts of the system other than channel 14 are operating perfectly).

The fact that the sequence B′(D) has at some point extended into a level outside of the permissible *m* level range is sensed by a level detector 22, which essentially comprises two-threshold gates, one for each end of the permissible voltage range, feeding through OR circuits to an output terminal. The output of level detector 22 is an error signal, which can be used either to give warning that an erroneous message is being received, or to suppress the received message and call for a retransmission of the same.

Inasmuch as the first decoder 18, FIG. 2, merely inverts the encoding operation performed by the correlative encoder 12, a second decoder 20 is provided for inverting the encoding operation performed by the precoder 10, thereby producing the final decoded sequence A′(D), which is identical with the original input sequence A(D) if no error has occurred. In the course of this final decoding operation, if an erroneous sequence B′(D) occupying a level other than one of the designated *m* levels should pass through the decoder 20, it will nevertheless be reduced to an *m* level output sequence A′(D) because of the fact that the decoder 20 performs a mod *m* conversion as part of its decoding function. For this reason, one may wish to prevent such a sequence B′(D) from even passing through the decoder 20. Such action may be accomplished by an obvious modification of the system shown in FIG. 2, which will not be shown herein.

Although the illustrated scheme will not detect every possible transmission error, it will detect all such errors that can possibly be detected due to the inherent redundancy of correlative level coding. This will account for a very large percentage of errors caused by faulty transmission.

A typical operating example now will be described for $G(D)=1-D^2$ and an input sequence A(D) having three level (i.e., $m=3$). This could be an original input sequence, or it could be a sequence resulting from a preliminary 2-to- 3-level transformation performed by suitable means (not shown). In the table shown below, designated Table I, the symbol $a_n$ represents the $n$–th digit of the input sequence A(D), FIG. 2; $b_n$ represents the corresponding digit of the precoded intermediate sequence B(D); $c_n$ represents the corresponding digit of the correlatively encoded sequence C(D). The symbols $c_n'$, $b_n'$ and $a_n'$ represent digits of sequences C′(D), B′(D) and A′(D) which are formed at the successive stages in the receiving end of the system shown in FIG. 2.

TABLE I

| | | | | | | | | | | | | | |
|---|---|---|---|---|---|---|---|---|---|---|---|---|---|
| $a_n$ | 1 | −1 | 0 | 1 | 1 | −1 | −1 | −1 | 0 | −1 | 0 | 0 | 1 |
| $b_n=a_n+b_{n-2}$ (mod 3) | 1 | −1 | 1 | 0 | −1 | −1 | 1 | 1 | 1 | 0 | 1 | 0 | −1 |
| $c_n=b_n-b_{n-2}$ | 1 | −1 | 0 | 1 | −2 | −1 | 2 | 2 | 0 | −1 | 0 | 0 | −2 |
| $c_n'$ | 1 | −1 | 0 | 1 | −2 | −1 | (−2) | 2 | 0 | −1 | 0 | 0 | −2 |
| $b_n'=c_n'+b_{n-2}'$ | 1 | −1 | 1 | 0 | −1 | −1 | [−3] | 1 | −3 | 0 | −3 | 0 | −5 |
| $a_n'=b_n'-b_{n-2}'$ (mod 3) | 1 | −1 | 0 | 1 | 1 | −1 | (1) | −1 | 0 | −1 | 0 | 0 | 1 |

In the above table, the digit in parentheses (−2) in the row designated $c_n'$ is assumed to result from an error that occurred during the transmission of a digit $c_n$ having the value +2. (It should be kept in mind that the permissible number of input levels in this case is 3, so that the encoded sequence is permitted to occupy as many as 5 different levels.) Upon being decoded by the first decoder 18, FIG. 2, the erroneously transmitted digit $c_n'=-2$ is converted to the digit $b_n'=-3$, enclosed in brackets. This is readily detected as an erroneous value because it does not occupy one of the three permitted value levels, +1, 0, and −1. Hence, when fully decoded, this member of the sequence will appear as the value $a_n'=(+1)$, which differs from the original value $a_n=-1$.

In the above-described example illustrated by Table I, the error was manifested by the appearance of a superfluous level in the sequence of digits $b_n'$ simultaneously with the occurrence of the error in the sequence of digits $c_n'$. This is not necessarily true in all cases. Table II below represents a situation in which the appearance of the superfluous level in the sequence of digits $b_n''$ (as indicated by the bracketed value −2) is delayed with respect to the occurrence of the error (1) in the sequence of digits $c_n''$. Hence, one is not always able to pinpoint the error in the sequence merely by determining the instant when the number of intermediate levels became excessive. However, the error signal generated by the system will mark the latest point in the sequence at which the error could have occurred.

TABLE II

| | | | | | | | | | | | | | |
|---|---|---|---|---|---|---|---|---|---|---|---|---|---|
| $c_n''$ | 1 | −1 | 0 | 1 | −2 | −1 | (1) | 2 | 0 | −1 | 0 | 0 | −2 |
| $b_n''=c_n''+b_{n-2}''$ | 1 | −1 | 1 | 0 | −1 | −1 | 0 | 1 | 0 | 0 | 0 | 0 | [−2] |
| $a_n''\equiv b_n''-b_{n-2}''$ (mod 3) | 1 | −1 | 0 | 1 | 1 | −1 | (1) | −1 | 0 | −1 | 0 | 0 | 1 |

FIG. 3 is a general showing of a modified system in which the functions of the precoder 10 and correlative encoder 12, FIG. 2, are combined into a unitary encoding network 26, while the functions of the first decoder 18, second decoder 20 and level detector 22 are combined into a unitary decoding network 28. The internal circuitry of the units 26 and 28 will be described presently. In any practical communication system of this kind, it should be recognized that while digital signals are being transmitted through the channel 14, their respective levels may deviate somewhat from the levels nominally established for the various digital values. In order to restore the signal voltages to their correct levels, a level-splitter 30 of conventional design is interposed between the channel 14 and the decoding network 28. The unit 30 is a discretely graduated threshold-gating device which sets upper and lower voltage limits for each value level. Any sampled signal whose amplitude falls between the upper and lower bounds of any given level is recognized as belonging to that level.

FIG. 4 illustrates how the encoding network 26, FIG. 3, can be constructed of simple, well-known parts such as digital adders, digital multipliers and a shift register. It will be assumed, as a general case, that the transfer function G(D) employed in the correlative level coding process has the form $g_o+g_1D+g_2D^2+......+gD^N$, where $N$ is a finite number. If it is known in advance that $g_o$ always will have a value of 1 and that some of the other coefficients $g_1$ through $g_N$ always will be zero, then certain of the multipliers shown in FIG. 4 may be eliminated.

Each successive digit of the input $m$ level sequence A(D) is applied as one input to an adder 32, the other input to this adder being described presently. Each output digit of adder 32 (which will be identical with the input A(D) digit for at least the first step of the precoding process) is fed through a mod $m$-detector 34 to a mod $m$-multiplier 36 that has a multiplication factor equal to $1/g_o$, expressed in mod $m$-form. The output of the multiplier 36 is a digit of the precoded sequence B(D). As each of the sequence B(D) digits is generated, it is fed to the first stage of a shift register 38, or equivalent tapped delay line, and as each succeeding B(D) digit is generated, the previously registered digit is shifted one place to the left, as viewed in FIG. 4, until it leaves the final or $N$'th stage of this register. The digits in the various stages of the shift register 38 are respectively multiplied by the multipliers $40_1$, $40_2$, etc., whose multiplication factors are $g_1$, $g_2$, etc. The respective outputs of these multipliers are fed in parallel to an adder 42, the output of which is applied to a multiplier 44 (whose multiplication factor is $-1$) and also to an adder 46. The output of multiplier 44 is applied as the second input to the above-mentioned adder 32, the first input to this adder being the current digit of the input sequence A(D). Thus, each B(D) digit that emerges from the multiplier 36 can partially determine the formation of as many as $N$ succeeding digits in the sequence B(D), depending upon the respective values of the various $g$ coefficients. It can be shown mathematically that the progressive subtraction process effectively performed by feeding the output of adder 42 through the ($-1$) multiplier 44 to adder 32, in conjunction with the operations performed by the mod $m$-detector 34 and the multiplier 36, is equivalent to dividing the sequence A(D) by the transfer function G(D) and expressing the result in mod $m$-form as the sequence B(D).

Each digit of the precoded sequence B(D) now is applied as one input to the adder 46, the other input to this adder being the current output digit of the adder 42. The output of the adder 46 is a digit of the correlatively encoded sequence C(D), which is an M-level sequence, since there is no mod $m$-conversion of this adder output. The first digit of the sequence C(D) will be identical with the first digit of the sequence B(D), and a limited number of the succeeding C(D) digits also may be identical with the correspondingly positioned digits of the sequence B(D), depending upon the respective values of the various $g$ coefficients. Beyond this point, however, the value of each succeeding digit in the sequence C(D) will be determined in part by the values of from 1 to $N$ preceding digits in the sequence B(D), depending upon the transfer function used. It can be shown mathematically that the progressive addition process effected by applying the output of adder 42 to adder 46 is equivalent to multiplying the precoded sequence B(D) by the transfer function G(D).

It can be deduced further that the progressive addition process effected by the adder 46 inverts the effect of the progressive subtraction process previously effected by the adder 32, whereby the encoded sequence C(D), when viewed in a mod $m$-format, would be identical with the input sequence A(D). However, in order to accomplish its purpose of limiting intersymbol interference within the channel 14 to a controlled amount, the correlatively encoded sequence C(D) must be allowed to remain in its M-level format while passing through the channel.

The units 34 and 36 in FIG. 4 may be replaced by a single multiplier unit having a mod $m$-detection capability, is desired.

FIG. 5 shows the construction of the decoding network 28 generally indicated in FIG. 3. This decoding network is similar to the encoding network of FIG. 4, except that the portion of the network 28 which converts the incoming M-level sequence C'(D) to the intermediate sequence B'(D) is not restricted to an $m$ level output. Consequently, the sequence B'(D) produced by this portion of the decoding network may occupy more than $m$ levels. If it does, this fact is sensed by the level detector 22, which thereupon furnishes an error signal. The error signal can be utilized merely to give a warning to the operator that a message containing an error is being received, or it can initiate a positive corrective action whereby the erroneous message is suppressed and a retransmission of the message is automatically requested.

Referring now to the details of decoding network 28, FIG. 5, the incoming M-level sequence C'(D) received from the transmission channel is applied as one input to the adder 50, the output of which is fed through a $1/g_o$ multiplier 52. The output of the multiplier, constituting a digit of the intermediate sequence B'(D), is fed back to the first stage of an $N$-stage shift register 54 to correspond with the $N$ possible values of the various $g$ coefficients of the transfer function $G(D)=g_o+g_1D+....g_ND^N$. In a special-purpose embodiment, where it is known that some of the $g$ coefficients always will be 0, some of the register stages and their associated output multipliers 56 may be eliminated. Similarly, if it is known that $g_o$ always will have a value of 1, the multiplier 52 can be omitted. The respective outputs of the $g$ multipliers 56 are applied to an adder 58, whose output is fed through a $-1$ multiplier 60 to the input adder 50. Thus, after a certain number of digits of the sequence C'(D) have passed through the adder 50 and multiplier 52 to form digits of the sequence B'(D), depending upon the values of the various $g$ coefficients, each newly generated digit of the sequence B'(D) can affect the values of from one to $N$ succeeding digits in that sequence, through the feedback loop just described.

The net effect of the operation just described, involving the progressive subtraction process effected by the $-1$ multiplier 60 and adder 50, is to divide the incoming sequence C'(D) by the transfer function G(D) and thereby produce a sequence B'(D) which is the exact inverse of the sequence C'(D). A hypothetical sequence identical with the sequence B'(D), if applied as input to the correlative encoder 12 in lieu of the precoded sequence B(D), FIGS. 2 and 4, would produce the sequence C'(D) actually received through the channel 14, if it had been error-free. This sequence B'(D) should occupy only $m$ levels, as B(D) did. If B'(D) extends outside the $m$ level range, and if all parts of the system other than the channel 14 are assumed to be error-free, then an error must have been introduced into the message during its passage through the channel, because the greater-than-$m$-level sequence B'(D) could not possibly be identical with the $m$ level sequence B(D). Under these conditions, the level detector 22 generates an error signal.

If the inverted sequence B'(D) is an $m$ level sequence (or even if it occupies more than $m$ levels, where no provision is made to suppress it), it is applied as one input to an adder 62, FIG. 5, the other input to which is the output of the adder 58. The progressive addition process performed by the adder 62 effectively re-establishes the M-level sequence C'(D) received from the transmission channel, and this sequence then is fed to a mod $m$ detector 64, which converts it to an $m$ level output sequence A'(D). If the transmission has been error-free, the output sequence A'(D) will be identical with the original input sequence A(D), FIG. 2. Units 62 and 64 may be combined.

Comparing the decoding network shown in FIG. 5 with the simple mod $m$ detector 16, FIG. 1 employed for decoding purposes in the conventional system, it can be seen that the present decoder has more parts than the conventional decoder used in correlative level coding systems. However, it has the advantage of being able to detect all detectable errors that occur in transmission, which the conventional system cannot do. Moreover, the circuit design shown in FIG. 5 makes efficient use of certain elements such as the shift register 54, multipliers 56 and adder 58, which perform dual functions in both stages of the decoding process, thereby effecting considerable economy in the fabrication cost. A similar observation can be made with respect to the encoding circuitry shown in FIG. 4, which offers a similar cost saving that is not realized in the conventional encoder construction.

Whenever an expression such as "M-level sequence" is employed herein, this should be understood as meaning a sequence that may occupy as many as M-levels. It does not mean that any given sequence necessarily will occupy all of these available M-levels, but merely that the sequence was generated by a particular process which, if randomly carried out for an indefinite time, would produce at least some sequences that occupy the number of levels specified.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a digital communication system of the correlative level coding type wherein a first sequence of digits, respectively represented by signals each occupying one of $m$ given-value levels, is precoded into a second digit sequence, represented by signals that do not occupy any levels other than said $m$-value levels, and said second sequence is then correlatively encoded into a third digit sequence, represented by signals that may occupy levels other than said $m$-value levels, which third sequence is then transmitted through a given channel, a method of decoding the digital sequences transmitted through said channel and detecting errors therein, comprising the steps of:

subjecting each digit sequence received from said channel to a decoding operation that is substantially the inverse of the encoding operation which converted said second sequence into said third sequence, said decoding operation being capable of producing a derived sequence that may occupy a level other than one of said $m$-value levels;

detecting whether any of the value levels actually occupied by said derived sequence is outside of the $m$ level range that said precoded sequence was permitted to occupy prior to said transmission;

and generating an error signal if said derived sequence at any time occupies such an outside level.

2. A decoding method comprising the steps set forth in claim 1 plus the following additional step:

subjecting said derived sequence to a further decoding operation which is substantially the inverse of the precoding operation that converted said first sequence into said second sequence, the output of said further decoding operation being an $m$ level sequence that is identical with said first sequence if said channel were error-free during said transmission.

3. In a digital communication system of the correlative level coding type in which an $m$ level input sequence A(D), definable as a polynomial of the form $$\sum_{i=0}^{\infty} a_i D^i$$

(where $D$ is a time-delay operator) is effectively divided by a transfer function G(D) of the form $$\sum_{i=0}^{N} g_i D^i$$

(where $N$ is a finite number), and a "mod $m$" reduction is performed upon the resulting quotient to produce an $m$ level precoded sequence B(D), and wherein the $m$ level sequence B(D) is then effectively multiplied by said transfer function G(D) to produce a sequence C(D) capable of occupying a level other than one of the $m$ levels that sequence B(D) may occupy, which sequence C(D) is then transmitted through a channel that is subject to transient error-producing conditions, an improved decoding and error-detecting apparatus for use in such a system comprising:

decoding means for receiving a sequence C'(D) transmitted through said channel, which sequence may or may not be identical with the aforesaid sequence C(D) produced by said correlative encoder, depending upon whether or not the channel was error-free during such transmission, and effectively dividing the received sequence C'(D) by the transfer function G(D) to produce a derived sequence B'(D), said decoding means enabling said derived sequence B'(D) to occupy a level other than one of said $m$ levels if necessary;

and error-detecting means responsive to the presence in said derived sequence B'(D) of a signal component occupying a level outside of said $m$ level range for generating a signal indicative of an error condition.

4. In a system as set forth in claim 3, an additional decoding means for effectively multiplying said derived sequence B'(D) by the transfer function G(D) and expressing the result in "mod $m$" form as a sequence A'(D), which is identical with the original sequence A(D) if no error were introduced during the transmission of sequence C(D) through said channel.

5. In a digital communication system of the correlative level coding type in which an $m$ level input sequence A(D), definable as a polynomial of the form $$\sum_{i=0}^{N} g_i D^i$$

(where $D$ is a time delay operator) is effectively divided by a transfer function G(D) of the form $$\sum_{i=0}^{\infty} a_i D^i$$

(where $N$ is a finite number), and a "mod $m$" reduction is performed upon the resulting quotient to produce an $m$ level precoded sequence B(D), and wherein the $m$ level sequence B(D) is then effectively multiplied by said transfer function G(D) to produce a sequence C(D) capable of occupying a level other than one of said $m$ levels, which sequence C(D) is then transmitted through a channel that is subject to transient error-producing conditions, an improved decoding and error detecting apparatus for use in such a system comprising:

a first adder having as one input thereto the successive digits of a sequence C'(D) received from said channel as the result of transmitting said sequence C(D) therethrough, said sequences C'(D) and C(D) being identical if the channel were error-free during such transmission;

a shift-register having at least as many stages as there are terms up to and including the highest-power term having a significant coefficient in the transfer function G(D);

a second adder;

means for applying the output of said first adder, multiplied by $1/g_o$, as input to the first stage of said shift-register and also as one input to said second adder, such input constituting the successive digits of a sequence B′(D);

a third adder;

means for applying the contents of the respective shift-register stages, each multiplied by the respective coefficient of its corresponding place in the power series G(D), as inputs to said third adder;

means for applying the output of said third adder, multiplied by −1, as a second input to said first adder, thereby to help define the digits of the sequence B′(D);

error-detection means for detecting the number of levels occupied by each signal in the sequence B′(D) and for generating an error signal if any such signal occupies a level outside of the *m*level range occupied by the precoded sequence B(D);

means for applying the output of said third adder as a second input to said second adder;

and means associated with said second adder for expressing the output of said second adder in "mod *m*" form as the successive digits of a sequence A′(D), which is identical with the original sequence A(D) if no error were introduced during the transmission of sequence C(D) through said channel.

* * * * *